United States Patent [19]

King et al.

[11] Patent Number: 5,550,434
[45] Date of Patent: Aug. 27, 1996

[54] BOOST-MODE ENERGIZATION AND MODULATION CIRCUIT FOR AN ARC LAMP

[75] Inventors: Kenneth J. King; Robert M. Zawislak; Richard C. Vokoun, all of Palatine, Ill.

[73] Assignee: Northrop Corporation, Los Angeles, Calif.

[21] Appl. No.: 247,832

[22] Filed: May 23, 1994

[51] Int. Cl.⁶ .................................................. H05B 37/02
[52] U.S. Cl. .................... 315/160; 315/307; 315/DIG. 7; 315/205; 315/289; 315/291; 359/180
[58] Field of Search ................. 315/DIG. 7, DIG. 5, 315/160, 161, 163, 164, 165, 307, 173, 171, 174, 175, 176, 166, 170, 205, 283, 209 T, 209 CD, 291, 242, 246, 289, 290; 359/180, 181, 184, 154

[56] References Cited

U.S. PATENT DOCUMENTS

| | | | |
|---|---|---|---|
| 3,156,826 | 11/1964 | Mutschler | 359/180 |
| 3,471,747 | 10/1969 | Gershen | 315/283 |
| 3,900,404 | 8/1975 | Dachs | 359/181 |
| 4,493,114 | 1/1985 | Geller et al. | 359/172 |
| 4,540,243 | 9/1985 | Fergason | 359/156 |
| 4,550,272 | 10/1985 | Kimura et al. | 315/86 |
| 4,742,276 | 5/1988 | Ku | 315/106 |
| 4,939,381 | 7/1990 | Shibata et al. | 315/307 X |
| 5,062,154 | 10/1991 | Geller et al. | 359/154 |
| 5,159,480 | 10/1992 | Gordon et al. | 359/181 |
| 5,191,460 | 3/1993 | Lapatovich | 359/154 |
| 5,245,252 | 9/1993 | Frus et al. | 315/209 R |

*Primary Examiner*—Robert Pascal
*Assistant Examiner*—Arnold Kinkead
*Attorney, Agent, or Firm*—Terry J. Anderson; Karl J. Hoch, Jr.

[57] ABSTRACT

Electrical activation of an arc lamp is accomplished by a plurality of circuits, each of which has a boost topology including a capacitor and a charging circuit for charging the capacitor by a series of current pulses. One of the circuits is an igniter circuit and includes a transformer to convert voltage from a relatively low voltage supply to a relatively high voltage for striking an arc within the lamp. A second of the circuits provides for a steady flow of current to maintain the arc after completion of ignition of the arc. The second circuit is protected from the high voltage of the first circuit by a saturable reactor connected in series between the second circuit and the arc lamp. A further circuit, employed as boost modulator, and constructed with the same form of boost topology, may be connected via a diode to a junction between the saturable reactor and the second of the foregoing circuits, the third circuit being useful for providing substantially larger amounts of plasma current, when desired, than such plasma current as can be provided by the second circuit. Also, if desired, the second circuit can include means for varying amplitudes of charging current pulses in response to an external signal, such as an audio signal, thereby to allow for communication of data on a beam of radiation emitted by the arc lamp.

5 Claims, 1 Drawing Sheet

BOOST-MODE ENERGIZATION AND MODULATION CIRCUIT FOR AN ARC LAMP

BACKGROUND OF THE INVENTION

This invention relates to the energization of an arc lamp, such as a lamp having a gas plasma for emitting infrared radiation upon electrical energization of the lamp and, more particularly, to a system of electric circuits for initially igniting the lamp and for sustaining an arc within the lamp, as well as a further circuit to provide for major increases in plasma current through the lamp, wherein each of the circuits is constructed with a boost topology including a capacitor and means for charging the capacitor by a series of current pulses.

Arc lamps require a relatively high voltage for striking an arc within the lamp, thereby to initiate flow of electric plasma current through material within the lamp. The material is selected to vaporize, in the manner of a gas, and to support a plasma electric current upon energization of the lamp. Typically, such lamps emit radiation wherein the frequency or frequencies of the radiation emitted by the lamp depend on the characteristics of the material within the lamp. For example, such emissions can be produced within the infrared region, the visible region, and the ultraviolet region of the spectrum, dependent on the choice of material employed within the lamp for generation of the plasma.

A problem arises in that, due to the need for both high and low voltages, it has been the practice to employ circuits requiring high voltage, particularly for ignition of the arc. Such circuitry tends to be cumbersome, both in terms of physical size and weight, as compared to low voltage transistor type circuits which have been employed in other electronic applications.

SUMMARY OF THE INVENTION

The aforementioned problem is overcome and other advantages are provided by a system and methodology for energization of an arc lamp to produce radiation suitable for signaling, wherein the energization is accomplished by a plurality of circuits each of which is constructed with a boost topology, and wherein one of the circuits serves for ignition of the arc, and a second of the circuits serves to maintain the arc. The boost topology includes a capacitor and means for charging the capacitor by a series of current pulses. Also, if desired, a third of the foregoing forms of circuit may be employed to provide for a substantial increase in plasma current through the arc as may be desirable in certain applications for occasionally radiating radiation having a substantially increased intensity. By varying the magnitude of pulses applied to the circuit which maintains the arc, an amplitude variation can be impressed upon the radiation which then, upon use of an amplitude detector of radiation, can serve as part of a signaling system for transmission of electromagnetic signals from the lamp which serves as a transmitter to a distant receiver.

In accordance with the invention, charging of the capacitor in the boost topology is accomplished by use of an inductor wherein a pulse generator operates an electronic switch, such as a transistor, to draw current through the inductor, and then to switch the current via a diode into a capacitor for charging the capacitor. Successive operation of the switch produces a succession of current pulses which, in step-wise fashion, raises the voltage across the capacitor to a value suitable for either ignition of the arc, or for maintenance of the arc.

BRIEF DESCRIPTION OF THE DRAWING

The aforementioned aspects and other features of the invention are explained in the following description, taken in connection with the accompanying drawing wherein the sole FIGURE shows a system of circuits, each of which has a boost topology, for igniting and maintaining an arc of an arc lamp.

DETAILED DESCRIPTION

Figure 1:
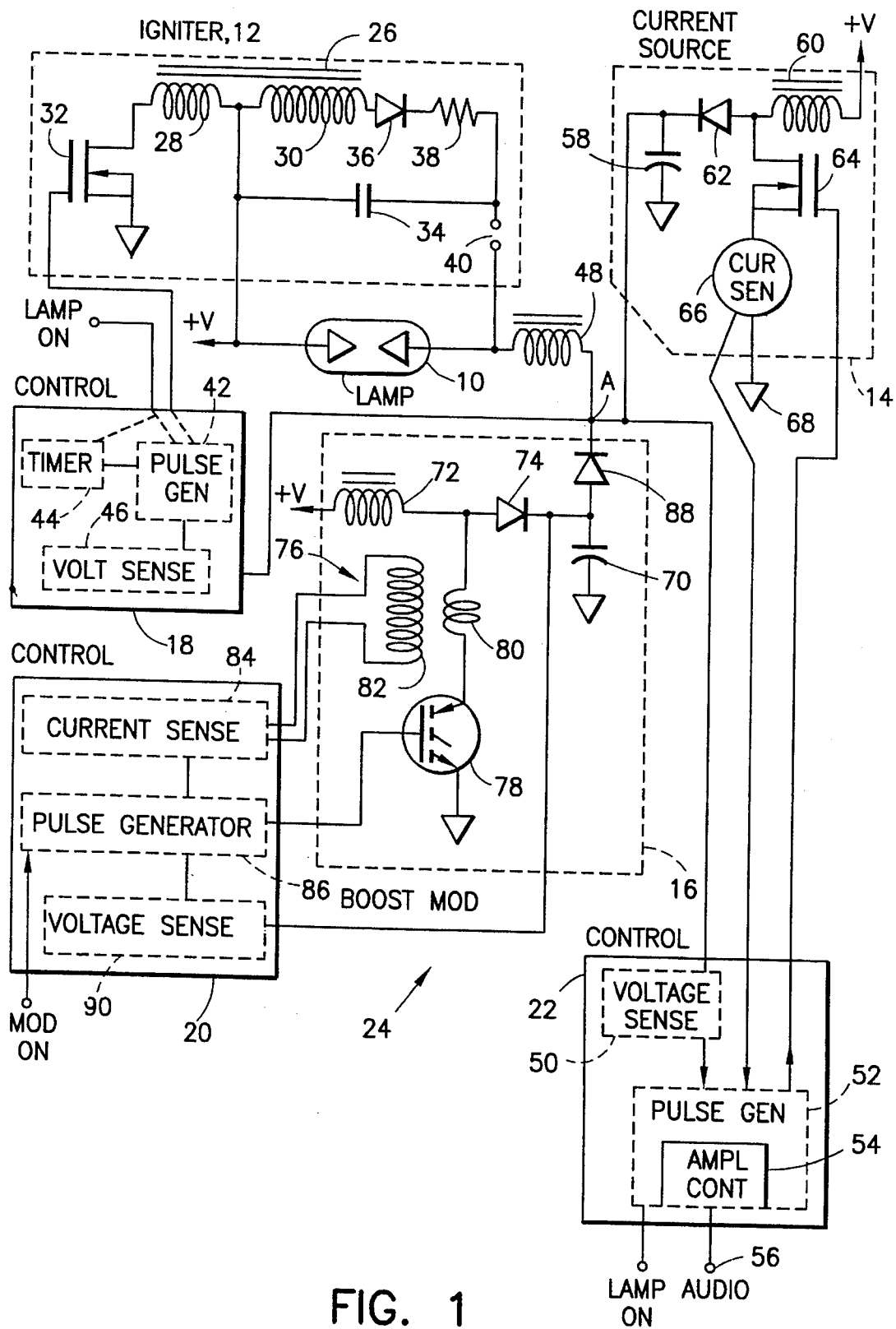

As shown in the FIGURE, an arc lamp 10 is energized, in accordance with the invention, by means of an igniter circuit 12 and a current source 14, both of which comprise electrical circuitry having a boost topology. A boost modulator 16 may also be used, if desired, for energizing the lamp 10. The boost modulator 16 has circuitry similar to that of the current source 14, the circuitry of the boost modulator 16 also having a boost topology. The igniter circuit 12, the current source 14, and the boost modulator 16, along with their respective controllers 18, 22, and 20 constitute a system 24 for electrically energizing the lamp 10. The operation of the system 24 begins with ignition of an arc in the plasma of the lamp 10 by means of the igniter circuit 12, this being followed by application of current from one or both of the units 14 and 16 supplying current to maintain the arc of the lamp 10. If desired, the current source 14 may be referred to as a simmer current source providing a relatively small amount of current to the lamp 10 while the boost modulator 16 is activated when it is desired to drive substantially larger amounts of current through the plasma of the lamp 10 than is provided by the simmer current source 14.

The igniter 12 comprises an auto transformer 26 having a primary winding 28 and a secondary winding 30, the auto transformer 26 being activated by the transistor 32 connected to the circuitry of the primary winding 28. The secondary winding 30 is magnetically coupled to the primary winding 28 and, upon application of current pulses by the transistor 32 to the primary 28, outputs current pulses of much smaller current but at much higher voltage to a capacitor 34 which constitutes a part of the boost topology. Feeding of boost current from the secondary winding 30 to the capacitor 34 is accomplished by means of a diode 36 and a resistor 38 serially connected with the diode 36 and the secondary winding 30 between the first and the second terminals of the capacitor 34. One terminal of the capacitor 34 connects by means of a spark gap 40 to a first terminal of the lamp 10, upon connection of the lamp 10 to the system 24. A second terminal of the capacitor 34 is connected directly to a second terminal of the lamp 10 upon connection of the lamp 10 to the system 24. The drain and the source terminals of the transistor 32 connect between the primary winding 28 and the signal return, or ground, while the gate terminal of the transistor 32 is energized with voltage pulses from a pulse generator 42 of the controller 18. The second terminal of the lamp 10 is connected to a source of positive voltage, preferably 24 volts dc in the preferred embodiment of the invention. Also included in the controller 18 are a timer 44 and a voltage sensor 46 connecting with the pulse generator 42.

Terminal A is an output terminal of the current source 14, and connects to the first output terminal of the igniter 12 via an inductor 48 comprising a saturable reactor. The voltage at terminal A is sensed by the voltage sensor 46 of the controller 18, and is sensed also by a voltage sensor 50 of the controller 22. Also included within the controller 22 is a pulse generator 52 having circuit serving as an amplitude controller 54 for control of the amplitude of voltage pulses outputted by the generator 52, the amplitude controller 54 being responsive to an audio signal at terminal 56.

The current source 14 comprises a capacitor 58, an inductor 60, a diode 62 interconnecting the inductor 60 with the capacitor 58, and a transistor 64 which constitute the boost topology of the current source 14. A current sensor 66, which may comprise a resistor having a relatively low resistance by way of example, is connected in series with the transistor 64 for outputting a signal to the pulse generator 52 indicating an amount of current flowing in the transistor 64. The drain and the source terminals of the transistor 64 connect the junction of the inductor 60 with the diode 62 to the signal return terminal 68, or ground, and a gate terminal of the transistor 64 is energized with pulses of voltage by the pulse generator 52.

In the operation of the current source 62, application of a pulse to the gate terminal of the transistor 64 places the transistor 64 in a state of conduction for initiating a pulse of current flow from the power supply terminal V through the inductor 60 and the transistor 64. Upon termination of the output pulse of the generator 52 to the gate terminal of the transistor 64, the transistor 64 is placed in a state of nonconduction, and the path of current flow shifts from the transistor 64 to the diode 62 for charging the capacitor 58. Upon application of a series of pulses to the gate terminal of the transistor 64, the transistor 64 operates in the manner of a switch to provide a corresponding succession of current pulses for charging the capacitor 58 in stepwise fashion to bring the voltage across the capacitor 58 to a desired value for operation of the lamp 10.

The configuration of the circuitry of the boost modulator 16 is essentially the same as that of the current source 14. The boost modulator 16 comprises a capacitor 70, an inductor 72, a diode 74 interconnecting the inductor 72 with the capacitor 70, and a series circuit of transformer 76 and transistor 78. The transformer 76 has a primary winding 80 with a relatively small number of terms and a secondary winding 82 with a relatively large number of turns. The transformer 76 serves to provide a measure of current flowing within the transistor 78, and applies an output voltage to a current sensor 84 within the controller 20. The gate terminal of the transistor 78 connects with a pulse generator 86 of the controller 20, whereby in response to a succession of current pulses outputted by the pulse generator 86, the transistor 78 is placed alternately in states of conduction and nonconduction. The transistor 78 is operated in the manner of a switch to switch current flowing from the positive power supply terminal V via the inductor 72. During a state of conduction of the transistor 78, the current from the inductor 72 flows via the transistor 78 to the signal return and, during a state of nonconduction of the transistor 78, flows from the inductor 72 via the diode 74 into the capacitor 70. This constitutes the boost topology and operation. An output voltage appearing across the capacitor 70 is coupled via a diode 88 to the terminal A for application to the lamp 10. The output voltage across the capacitor 70 is also applied to a voltage sensor 90 of the controller 20.

In the operation of the system 24, the igniter 12 provides a voltage of 7,000 volts across the capacitor 34 in response to energization of the igniter 12 from a voltage V of 24 volts dc. It is to be understood that these voltages are given by way of example, and that the theory of the invention is applicable to other values of voltage. The saturable reactor of the inductor 48 provides a high impedance path allowing a high voltage ignition pulse to be developed across the lamp 10 while protecting the low voltage circuitry of the current source 14 and the boost modulator 16 from failure during lamp ignition. Initially, in the preferred embodiment of the invention, the inductance of the saturating reactor is approximately 1 milihenry, but falls rapidly once current from the source 14 begins to flow through the inductor 48 and the lamp 10. The signal for initiating energization of the lamp is indicated as the lamp-on signal in the drawing, and is applied to the pulse generator 42 of the controller 18 and to the pulse generator 52 of the controller 22.

In response to the lamp-on signal, the pulse generators 42 and 52 apply voltage pulses respectively to the transistors 32 and 64 of the igniter 12 and the current source 14. This results in operation of the boost circuitry with charging of the capacitors 34 and 58, respectively. If desired, the boost modulator 16 may also be activated by applying the modulation-on signal to the pulse generator 86 of the controller 20, thereby to operate the transistor 78 to charge the capacitor 70. The sensing of voltage at terminal A by the voltage sensor 50, and the outputting of a voltage sense signal to the pulse generator 52 enables the controller 22 to operate the current source 14 over a desired output voltage range, for example, 115 V dc to 141 V dc prior to ignition of the lamp 10. Furthermore, in the event that the voltage rises above the range, then the voltage sense signal of the sensor 50 disables the pulse generator 52 until the voltage falls back within the normal operating range. In similar fashion, in the event that an excessive amount of current is sensed by the current sensor 66 of the source 14, the pulse generator 52 is also disabled until the sense voltage drops below a critical threshold value, at which point operation of the pulse generator 52 can resume.

The voltage sensor 46 of the controller 18 monitors the voltage across the lamp 10 and terminates any further ignition pulses of the igniter 12 when the lamp voltage falls to less than 45 V dc indicating that an arc has been established in the lamp. During flow of plasma current in the lamp 10, the voltage drop across the lamp 10 falls within a steady state range of typically 15–25 volts for a typical infrared lamp as is employed in the preferred embodiment of the invention. Immediately after ignition, the current source 14 begins to deliver current through the saturating reactor of the inductor 48 to the lamp 10. In the preferred embodiment of the invention, a minimum of 3 amperes dc is required to maintain the arc in the lamp 10. The current source 14 provides this minimum value of current. In the event that significantly larger amounts of current, such as current pulses in the range of 50 amperes to 200 amperes, are desired for the lamp 10, then the boost modulator 16 can be activated by the modulator-on signal applied to the pulse generator 86. In the event that the lamp fails to ignite within the predetermined amount of time, the timer 44 shuts down the pulse generator 42. The current source 14 can deliver up to a maximum of 20 amperes dc current to the lamp 10. The switching frequency in the current source 14 is in the range of approximately 25 kHz (kilohertz) to 83 kHz in a preferred embodiment of the invention, with similar switching frequencies being present also in the igniter 12 and the modulator 16 although much higher switching frequencies are possible.

In the current source 14 and in the igniter 12, the transistors 64 and 32 are field-effect transistors. More specifically, each transistor is a MOSFET. If desired, a few of these transistors may be wired in parallel for more efficient delivery of high current. However, in the case of the boost modulator 16, much larger values of current are employed and, accordingly, the transistor of choice is an IGBT, namely, an insulated gate bipolar transistor. Preferably, several or more of the bipolar transistors are connected in parallel to accommodate the high current without undue voltage drop across the transistors. The voltage drop due to current flow through the transistor is much lower in the case of the IGBT than in the case of the MOSFET, this dictating the choice of transistor in the different current supply circuits.

If desired, the modulator 16 may be utilized also during the ignition phase of the lamp 10. Due to the saturation characteristics of the saturating reactor of the inductor 48, a large current pulse is generated by the reactor immediately after ignition of the lamp 10. The resulting pulse of current is sourced by the source 14. The magnitude of the pulse is large enough to discharge the output capacitor 58 of the source 14. In order to avoid the chance that the source 14 may run out of current momentarily resulting in a quenching of the arc of the lamp 10, it is advantageous to have the boost modulator 16 activated at this time to serve as a secondary current source to quickly recharge the output capacitors of the simmer current source 14. In the controller 20, the current sensor 84 and the voltage sensor 90 serve to disable the pulse generator 86 in the event that excessive current flow is noted in the inductor 72 or in the event that excessive voltage is noted across the capacitor 70 of the boost modulator 16.

The foregoing description shows that the circuitry and methodology of the invention provide for efficient and convenient operation of an arc lamp.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A system for energizing an arc lamp to emit radiation, comprising:

an igniter circuit having a first terminal and a second terminal, the first terminal and the second terminal of the igniter circuit to be connected to a first terminal and a second terminal, respectively, of the arc lamp, the igniter circuit having a boost topology, said first terminal of said igniter circuit serving as an output terminal of said igniter circuit;

a current supply circuit having an output terminal connected to the first terminal of said igniter circuit, the current supply circuit having a boost topology;

a boost modulator circuit having an output terminal connected via a junction to said output terminal of said current supply circuit, said boost modulator circuit having a boost topology, there being a coupling diode for connecting said output terminal of said boost modulator circuit to said junction;

a saturable-reactor inductor connected between said junction of said output terminals of said current supply and said boost modulator circuits and said first terminal of said igniter circuit; and wherein each of said boost topologies of said igniter and said current supply and said boost modulator circuits includes a capacitor and means for charging the capacitor by a series of current pulses;

in each of said boost topologies, said charging means includes an inductor, pulsing means for generating a series of current pulses within said inductor, and means for switching the current pulses within said inductor to said capacitor;

said switching means comprises a diode connecting a first terminal of said inductor to said capacitor, and a transistor for switchably directing a current through said inductor to ground;

said system further comprises means for sensing a voltage outputted by said boost modulator circuit to said junction, said voltage sensing means being operatively coupled to said pulsing means of said boost modulator circuit for control of the voltage outputted by said boost modulator circuit; and means for sensing a current outputted by said current supply circuit to said junction, said current sensing means being operatively coupled to said pulsing means of said current supply circuit for control of the current outputted by said current supply circuit.

2. A system according to claim 1 wherein, in each of said charging means of said respective boost topologies, said pulsing means includes an amplitude control circuit responsive to an external amplitude control signal for varying amplitudes of pulses of said series of current pulses.

3. A system according to claim 1 wherein said saturable-reactor inductor serves as a voltage protection circuit between said output terminal of said current supply circuit and said first terminal of said igniter circuit.

4. A method for energizing an arc lamp to emit radiation, the method comprising steps of:

connecting an igniter circuit between a first terminal and a second terminal of the arc lamp, the igniter circuit having a first terminal and a second terminal, the first terminal and the second terminal of the igniter circuit connecting with said first and said second terminals, respectively, of the arc lamp, the igniter circuit having a boost topology;

connecting a current supply circuit via an output terminal thereof to the first terminal of said igniter circuit, the current supply circuit having a boost topology;

connecting a boost modulator circuit via an output terminal thereof and via a coupling diode and via a junction to said output terminal of said current supply circuit, said boost modulator circuit having a boost topology;

protecting said current supply circuit by connecting a saturable-reactor inductor from said first terminal of said igniter circuit to said junction of said output terminals of said current supply and said boost modulator circuits;

providing each of said boost topologies of said igniter and said current supply and said boost modulator circuits with a capacitor and circuitry for charging the capacitor by a series of current pulses;

in each of said boost topologies, constructing said charging means with an inductor, pulsing means for generating a series of current pulses within said inductor, and means for switching the current pulses within said inductor to said capacitor;

in each of said boost topologies, constructing said switching means with a diode connecting a terminal of said inductor to said capacitor, and a transistor for switchably directing a current though said inductor to ground;

providing means for sensing a voltage outputted by said boost modulator circuit to said junction, add operatively coupling said voltage sensing means to said pulsing means of said boost modulator circuit for control of the voltage outputted by said boost modulator circuit; and providing means for sensing a current outputted by said current supply circuit to said junction, and operatively coupling said current sensing means to said pulsing means of said current supply circuit for control of the current outputted by said current supply circuit.

5. A method according to claim 4 wherein, for each of said charging means of said respective boost topologies, providing said pulsing means with an amplitude control circuit responsive to an external amplitude control signal for varying amplitudes of pulses of said series of current pulses.

* * * * *